F. S. MORTON.
BALL BEARING.
APPLICATION FILED JULY 1, 1918.
1,300,450.
Patented Apr. 15, 1919.
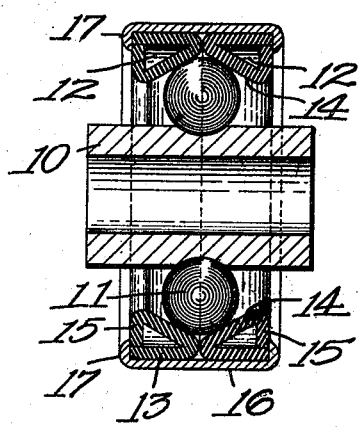
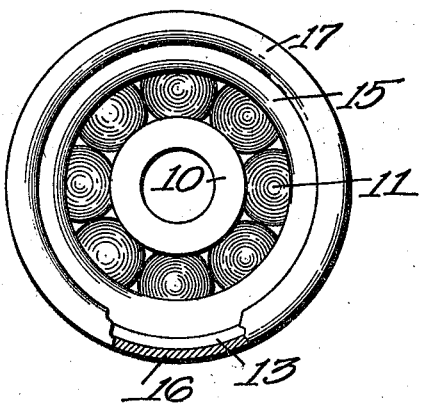
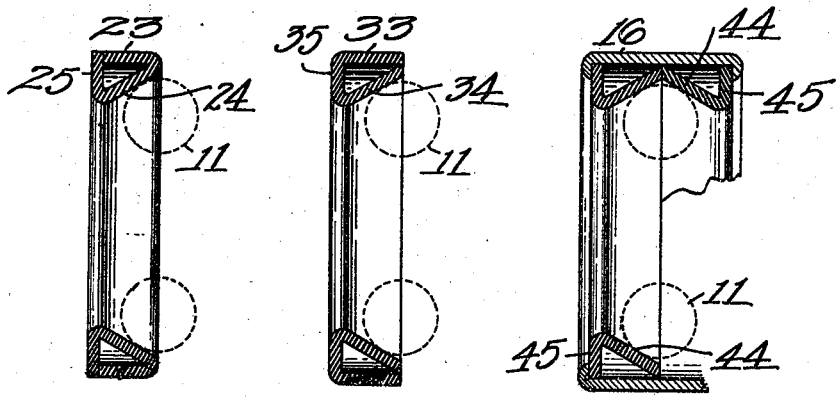
Inventor
Fred S. Morton
by attorneys
Southgate & Southgate
Witness
C. F. Mason

UNITED STATES PATENT OFFICE.

FRED S. MORTON, OF WORCESTER, MASSACHUSETTS.

BALL-BEARING.

1,300,450.  Specification of Letters Patent.  Patented Apr. 15, 1919.

Application filed July 1, 1918. Serial No. 242,726.

*To all whom it may concern:*

Be it known that I, FRED S. MORTON, a citizen of the United States, residing at Worcester, in the county of Worcester and State of Massachusetts, have invented a new and useful Ball-Bearing, of which the following is a specification.

This invention relates to ball bearing of annular form and more specifically to that type thereof made of sheet metal.

The principal object of this invention is to construct such a ball bearing in a small number of pieces and of great strength and perfection so that the cost can be kept down to a low rate and the tools by which they are made may be of a comparatively simple character, but more especially to provide for making the annular rings which constitute the race-ways for the balls of such construction that they will be particularly strong, having integral parts that brace them against each other so that comparatively large bearings can be made out of thin stock, especially for light work. The invention also involves certain specific ways of bracing the ball ring itself.

Reference is to be had to the accompanying drawings, in which—

Figure 1 is a central sectional view of an annular ball bearing constructed in accordance with this invention showing it complete;

Fig. 2 is a side view of the same;

Fig. 3 is a view similar to Fig. 1 of another form of this invention, and

Figs. 4 and 5 are similar views of other modifications.

In the form of the invention shown in Figs. 1 and 2 the parts are shown assembled to constitute a complete bearing, although all the parts are not illustrated in the other figures. The ordinary central member 10 having a groove in which the balls 11 run may be of any ordinary description and will not be described in detail.

The outer raceway for the balls is formed of two annular rings 12. Each of these rings in this form of the invention is formed of a single piece having a cylindrical outer portion 13, a conical inner portion 14, and a flat edge portion 15. It will be understood, of course, that the particular shape specified is not necessary, that is, the portion 13 will be cylindrical if a cylindrical bearing is to be made.

In the manufacture of this annular member a piece of flat sheet stock is cut out by dies and shaped to desired shape, and then the outer flange 13 is pressed back from the main portion 14 with its outer edge extending as far as the main portion 14 does. Then the flange 15 is pressed outwardly and is so designed that it comes just inside the ring 13 and bears against the inside of its edge. In this way any pressure by the balls on the conical part 14 is transmitted directly to the outer cylindrical ring 13 by one end of the cone 14 and through the strut or bracing member 15. It is transmitted without diminution to the outer edge of the ring 13 because the end of the flange 15 fits closely against the inner cylindrical surface thereof.

Two of these annular rings are put together as shown in Fig. 1 with balls in them and then held in position by the outer casing 16 flanges over its ends as shown at 17. An extremely strong rigid and durable construction is secured, although in many instances it may be made of lighter stock than has been the case heretofore on account of the bracing action secured by the flange 15 against the edge of the cylinder 13. In this way it is braced within the ball ring itself and a maximum of strength secured.

In the form shown in Fig. 3 the parts are similar and the conical portion 24 is substantially the same as the conical portion 14 in Fig. 1. The outer ring 23 is shorter than in Fig. 1 by exactly the thickness of the metal of which the cone is made. The edge flange 25 is longer than in Fig. 1 by about the same distance. In other words it overlaps the end of the ring 23 instead of being overlapped by it.

In the form shown in Fig. 4 the outer portion of the annular ring 35 is cylindrical as shown and extends throughout the width of the ring. It is connected by the end portion 35 with the conical portion 34. In this case the brace 35 is integrally connected directly with both the inner and outer members 34 and 33 and it forms an extremely strong kind of brace, but here the contacting ends of the parts 33 and 34 are in engagement within the body of the device and as two of them are placed together no material amount of strength is lost at this point.

In the form of the invention shown in Fig. 5 the outer ring is entirely omitted and the whole annular ring is formed of the conical portion 44 and the flat edge flange 45. The end of the latter fits under the casing at 16 and the opposite end of the conical member 44 also engages this casing directly. In this way the bracing action is secured, but not in the annular ring itself but only at the edge of the casing 16.

In all the forms great strength and rigidity are secured by the use of comparatively thin metal. The flat bracing flange also fills the space between the edge of the casing 16 and the ball race so that foreign substances cannot enter.

Having described a preferred embodiment of the invention and certain modifications thereof I wish to be understood that these are not all of the forms in which the invention can be carried out, but that other modifications can be made therein without departing from the scope of the invention as expressed in the claims. Therefore I do not wish to be limited to the exact details of construction herein shown but what I do claim is:—

1. A ball bearing race-way member comprising two annular rings, each having a conical bearing surface for receiving the balls between them, and each having an outwardly extending bracing member constituting the outer surface of the article connected with the main portion at the end of the conical surface.

2. A ball bearing race-way member comprising two annular rings formed of sheet metal, each having a conical bearing surface for receiving the balls between them, and each having an outwardly extending flat bracing member integral with it and connected with the main portion at the small end of the conical surface.

3. A ball bearing race-way member comprising two cup rings formed of sheet metal, and a casing surrounding the outer sides of said rings and holding them together at their outer edges, the rings comprising a cone and an integral flat bracing member at the small end of said cone projecting outwardly therefrom and constituting the outer surface of the bearing and also extending toward said casing and constituting a strut to take the strain.

4. A ball bearing race-way member comprising two cup rings formed of sheet metal, and a casing surrounding the outer sides of said rings and holding them together at their outer edges, the rings each comprising a cone and an integral flat bracing member at the small end of said cone projecting into contact with the inner surface of the casing all around and constituting the outer surface of the bearing and also a strut to take the strain.

5. A ball bearing race-way member comprising two cup rings formed of sheet metal, and a casing surrounding the outer sides of said rings and holding them together at their outer edges, the rings each comprising a cone and bracing member at the small end of said cone projecting outwardly therefrom toward said casing and constituting a strut to take the strain, each of said rings also having cylindrical portion on the outer side integrally connected with the other end of the conical portion and fitting inside said casing, and also receiving the edge of said strut member against its inner surface to receive the thrust therefrom.

6. A ball bearing race-way member comprising two annular rings formed of sheet metal, each having a conical bearing surface for receiving the balls between them, and each having an outwardly extending bracing member integral with it and connected with the main portion at the end of the conical surface, and a cylindrical member integral with the conical part at one end thereof and fitting inside the casing.

In testimony whereof I have hereunto affixed my signature.

FRED S. MORTON.

Copies of this patent may be obtained for five cents each, by addressing the "Commissioner of Patents, Washington, D. C."